March 18, 1969     H. A. KOCH ET AL     3,433,236
WHEEL WASHING APPARATUS
Filed June 7, 1967
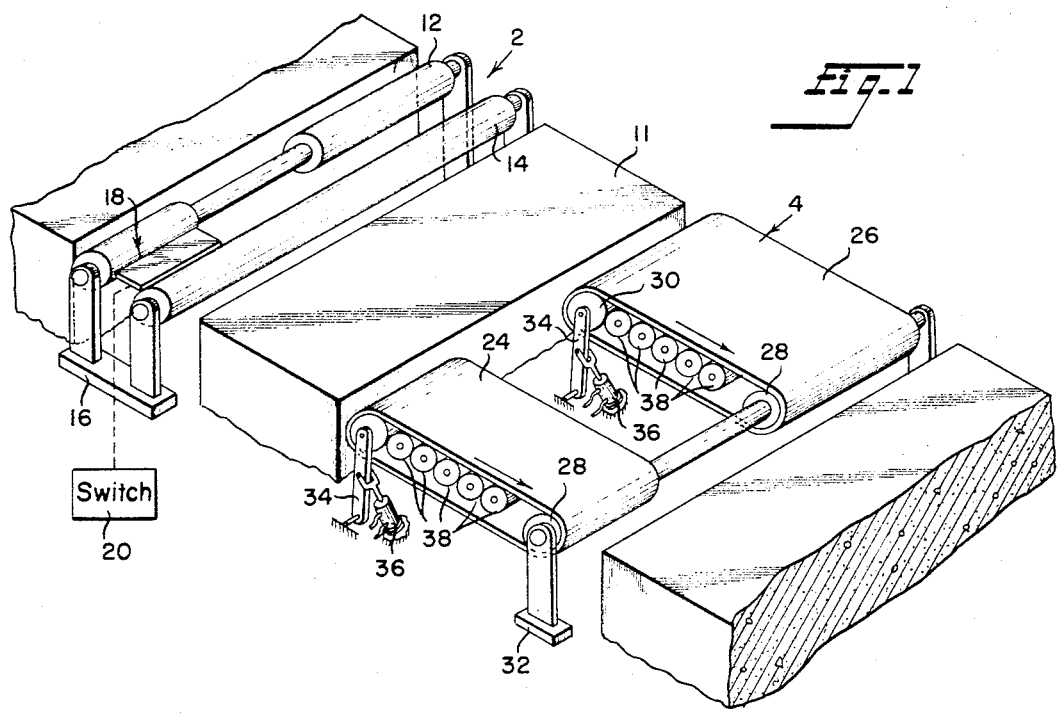
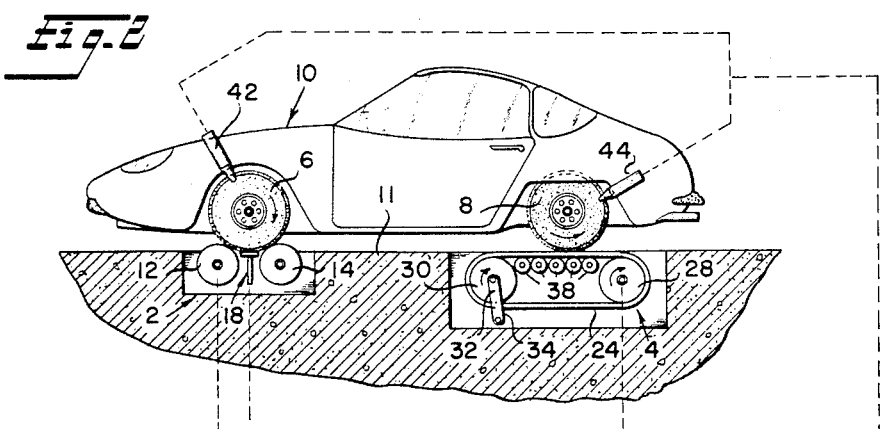
INVENTORS
Henry A. Koch
Robert L. Long
BY Griesbauer & Laubscher
ATTORNEYS
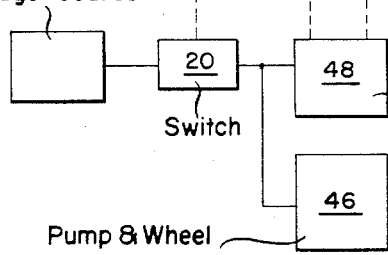

3,433,236
WHEEL WASHING APPARATUS
Henry A. Koch, 621 N. Morley St., and Robert L. Long, 712 St. Charles St., both of Moberly, Mo. 65270
Filed June 7, 1967, Ser. No. 644,241
U.S. Cl. 134—45                                           1 Claim
Int. Cl. B60s 3/06; B08b 3/02

ABSTRACT OF THE DISCLOSURE

Wheel washing apparatus including roller means and endless conveyor means for supporting the front and rear wheels, respectively, of a motor vehicle. The roller and endless conveyor means are so driven by a common drive motor that the front and rear wheels are driven in opposite directions during the application of cleaning fluid thereto by conventional pump and wheel spray nozzle means.

---

This invention relates generally to wheel washing apparatus, and more particularly to wheel washing apparatus including means for simultaneously rotating the front and rear wheels of the vehicle in opposite directions, respectively, and for spraying a cleaning fluid thereon.

As evidenced by the U.S. Patents to Hurst No. 2,692,214 and Cunningham No. 3,009,469, it is known in the patented prior art relating to automobile washing apparatus to provide motor-driven means for rotating the wheels during the washing thereof by a conventional cleaning fluid.

In the recent development of car wash systems of the type in which the car is maintained stationary during the various washing, rinsing and drying steps (rather than proceeding on conveyor means through the successive stations of a car wash system), the problem occurs that it is difficult, during the wheel cleaning cycle, to rotate simultaneously the front and rear wheels of automobiles having different wheel bases. Furthermore, it has been a problem to maintain the vehicle stationary during the wheel cleaning cycle. In order to readily accommodate various types and styles of motor vehicles, the present invention was developed.

The primary object of the present invention is to provide improved car wash means including roller means for driving the front wheels during the cleaning cycle, and endless conveyor means for driving the rear wheels simultaneously with the front wheels. According to the preferred form and embodiment of the invention, the endless conveyor means for driving the rear wheels during the cleaning cycle comprise at least one endless belt supported by drive and idler rollers, said idler roller being adjustable relative to the drive roller to vary the tension of the belt.

Other objects and advantages of the invention will become apparent from a study of the following specification, when viewed in the light of the accompanying drawing, in which:

FIG. 1 is a perspective view, with certain parts removed, of the roller and endless belt means for supporting the front and rear wheels of the vehicle, respectively; and FIG. 2 is a diagrammatic and schematic illustration of the wheel spraying and electrical systems.

Referring to the drawings, the wheel washing apparatus includes roller means 2 and endless conveyor means 4 for supporting the front and rear wheels 6 and 8, respectively, of a motor vehicle 10. The upper surfaces of the roller and endless conveyor means are generally coplanar with the floor surface 11 of the car wash structure. The roller means 2 includes a pair of spaced drive and idler rollers 12 and 14, respectively, supported by fixed bearing means (illustrated diagrammatically at 16) between which is arranged the actuator plate 18 of normally-open switch means 20.

The endless conveyor means 4 comprises a pair of endless belts 24, 26 each of which is supported at one end by a drive roller 28 and at the other end by an idler roller 30. The drive roller 28 is supported by fixed bearings 32, and the idler roller is carried by a pivot arm 34 that is operable by hydraulic motor means 36 to displace the roller 30 relative to roller 28 to vary the tension of the endless belt. A plurality of idler rollers 38 are arranged between the drive rollers 28 and the idler rollers 30 to support the intermediate portion of the upper run of the endless belt.

As shown in FIG. 2, nozzles 42, 44 supplied with cleaning fluid from the pump and wheel spray means 46 are arranged adjacent the roller and endless belt stations to direct cleaning fluid upon the front and rear wheels 6 and 8, respectively. A wheel drive motor 48 is provided for so driving drive rollers 12 and 28 that the front and rear wheels of the vehicle are driven in opposite directions, respectively, as shown by the arrows, so that there is no tendency for the vehicle to move forwardly or rearwardly. As shown by the circuit diagram, the wheel drive motor 48 and pump and wheel spray means 46 are simultaneously activated upon closure of the switch 20 by the weight of the vehicle front wheels upon the switch actuator plate 18. Consequently, as the front and rear wheels are driven in opposite directions, they are cleaned by the fluid supplied via nozzles 42 and 44, respectively.

While in accordance with the provisions of the patent statutes the preferred form and embodiment of the invention has been illustrated and described, it will be apparent to those skilled in the art that changes may be made in the disclosed apparatus without deviating from the invention set forth in the following claim.

What is claimed is:
1. In car washing apparatus of the type in which the vehicle is maintained stationary during the washing of the tires thereof, the invention which comprises:
   front roller means for supporting the front wheels of the vehicle and including a pair of parallel horizontally-spaced front rollers supported for rotation about fixed axes;
   separate endless conveyor means for supporting each of the rear wheels of the vehicle, respectively, each of said conveyor means including an endless conveyor, parallel horizontally spaced relatively adjustable drive and idler roller means supporting the ends of the conveyor, and a plurality of fixed load bearing roller means arranged between said drive and idler roller means to support intermediate portions of the upper runs, respectively, said conveyors extending longitudinally of the vehicle with the upper runs lying in a common horizontal plane;
   normally de-energized pump and spray means for spraying fluid upon each of the front and rear wheels;
   normally de-energized drive means for driving said front roller means and said endless conveyor means to rotate the front and rear wheels of the vehicle in opposite directions;
   vehicle-operated switch means for energizing said pump and spray and drive means, said switch means including an actuator extending between said front rollers for operation by one front wheel of the vehicle; and
   separate motor means associated with each of said idler roller means, respectively, to maintain constant the tension in the associated endless conveyor, whereby the vehicle is maintained immobile to prevent un- desired operation of said switch means during the cleaning cycle.

References Cited

UNITED STATES PATENTS

| | | | |
|---|---|---|---|
| 1,487,062 | 3/1924 | Hohl | 134—123 XR |
| 2,807,271 | 9/1957 | Spinner | 134—45 |
| 2,986,267 | 5/1961 | Carlson et al. | 198—208 |

FOREIGN PATENTS 393,946  11/1965  Switzerland.

ROBERT L. BLEUTGE, *Primary Examiner.*

U.S. Cl. X.R.

134—126; 188—152; 192—4; 198—208